US008130709B2

(12) United States Patent
Kim et al.

(10) Patent No.: US 8,130,709 B2
(45) Date of Patent: Mar. 6, 2012

(54) APPARATUS AND METHOD FOR TRANSMITTING AND RECEIVING CONTROL INFORMATION FOR UPLINK DATA IN A MOBILE COMMUNICATION SYSTEM AND SYSTEM THEREOF

(75) Inventors: Soeng-Hun Kim, Suwon-si (KR); Gert Jan Van Lieshout, Middlesex (GB); Kyeong-In Jeong, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 657 days.

(21) Appl. No.: 12/267,406

(22) Filed: Nov. 7, 2008

(65) Prior Publication Data
US 2009/0129326 A1    May 21, 2009

(30) Foreign Application Priority Data
Nov. 8, 2007    (KR) .......................... 10-2007-0113738

(51) Int. Cl.
*H04W 4/00*    (2009.01)
*H04J 3/16*    (2006.01)
*H04B 7/212*    (2006.01)

(52) U.S. Cl. ........................ 370/329; 370/437; 370/444

(58) Field of Classification Search .................. 370/328, 370/329, 437, 442–444
See application file for complete search history.

(56) References Cited

U.S. PATENT DOCUMENTS
| 2004/0017825 | A1 | 1/2004 | Stanwood et al. |
| 2006/0251027 | A1 | 11/2006 | Chun et al. |
| 2007/0081498 | A1 | 4/2007 | Niwano |
| 2008/0130557 | A1 * | 6/2008 | Kuchibhotla et al. ......... 370/329 |

FOREIGN PATENT DOCUMENTS
| EP | 1 643 694 A2 | 4/2006 |
| EP | 1 783 968 A2 | 5/2007 |
| WO | WO2007104810 | * 9/2007 |

* cited by examiner

*Primary Examiner* — Ronald Abelson
(74) *Attorney, Agent, or Firm* — Jefferson IP Law, LLP

(57) ABSTRACT

A method for transmitting control information for uplink data in a mobile communication system is provided. The method includes defining a plurality of transmission data having different priorities, and determining whether there is a need for transmission of particular transmission data, for which a minimum data rate should be guaranteed, among the plurality of transmission data, and when there is a need for transmission of the particular transmission data, transmitting control information indicating a highest priority among priorities of the plurality of transmission data, along with the particular transmission data.

20 Claims, 14 Drawing Sheets

| 701 | 703 |
|---|---|
| Type = highest priority indicator | Highest Priority |

FIG.7A

| 751 | 753 | 755 |
|---|---|---|
| Type = highest priority indicator | Highest Priority | Buffer Size |

FIG.7B

APPARATUS AND METHOD FOR TRANSMITTING AND RECEIVING CONTROL INFORMATION FOR UPLINK DATA IN A MOBILE COMMUNICATION SYSTEM AND SYSTEM THEREOF

PRIORITY

This application claims the benefit under 35 U.S.C. §119(a) of a Korean patent application filed on Nov. 8, 2007 in the Korean Intellectual Property Office and assigned Serial No. 10-2007-0113738, the entire disclosure of which is hereby incorporated by reference.

BACKGROUND OF THE INVENTION

1. Field of the Invention

The present invention relates to an apparatus and method for transmitting and receiving control information for uplink data in a mobile communication system and a system thereof. More particularly, the present invention relates to an apparatus and method for transmitting and receiving control information for uplink data considering a change in buffer status of a User Equipment (UE), and a system thereof.

2. Description of the Related Art

In the $3^{rd}$ Generation Partnership Project (3GPP), standardization for Long Term Evolution (LTE) as one of the next-generation mobile communication systems is under way. LTE is a technology for implementing high-speed packet-based mobile communication having a data rate of a maximum of 100 Mbps, aiming at deployment in around 2010. For example, this includes a high-speed wireless access technology and a Multi Band Multi Carrier (MBMC) technology. Based on a 20 MHz bandwidth, the technology is expected to offer services supporting data rates of 100 Mbps in the downlink and 50 Mbps in the uplink. In conclusion, it will provide a smooth transition path to the $4^{th}$ Generation (4G) system.

As a configuration of the currently proposed LTE, a 2-tier model has been proposed, which is composed of an Enhanced Node B (ENB) serving as a Node B and a Radio Network Controller (RNC), and an Access Core Gateway (ACGW) serving as a Serving GPRS Support Node (SGSN) and a Gateway GPRS Support Node (GGSN). Such an LTE configuration is composed of an ENB that performs an Automatic Repeat reQuest (ARQ) function, or retransmission technology, and a Radio Resource Control (RRC) function, or a function for determining wireless resources and handover, and of an ACGW that serves as a core network in LTE. The GGSN, SGSN and RNC nodes are implemented as a single central node of ACGW. Therefore, the ENB has been designed in a flexible structure where it can be connected to several LTE ACGWs, like the Iu interface in UMTS Terrestrial Radio Access Network (UTRAN).

In LTE, all user traffic, including real-time services such as Voice over Internet Protocol (VoIP), will be serviced over a shared channel, and thus there is a need for an apparatus for gathering state information of UEs and performing scheduling depending the state information. The scheduling is performed by a scheduler of an ENB, and the scheduler manages and allocates wireless transmission resources, and receives buffer status reports from UEs before allocating uplink wireless transmission resources.

When a UE is driving several services, radio bearers are formed separately for the services in the UE, and a buffer is provided for each of the formed radio bearers. The UE reports to the ENB the amount of data separately stored in buffers for the radio bearers, or sums the amount of data stored in each radio bearer group made by grouping radio bearers having similar properties, and reports the results to the ENB. Herein, control information including buffer status for each radio bearer or each radio bearer group is referred to as 'scheduling information'.

The ENB performs scheduling depending on the buffer status reported by UEs, and in this case, the date with the highest priority that the UE transmits to the ENB greatly affects the scheduling. The priority of transmission data is assigned to each radio bearer independently, and may be implemented as an index indicating an importance of the data transmitted over the radio bearer. For example, a higher priority is assigned to transmission data on a radio bearer for transmitting/receiving control messages, while a lower priority is appointed to transmission data on a radio bearer over which a packet service, which is insusceptible to delay, is provided. The UE and the ENB commonly perform scheduling using priority as an absolute criterion. With reference to FIG. 1, a description will now be made of a process of performing scheduling using priority as an absolute criterion.

FIG. 1 is a diagram illustrating a procedure for reporting by a UE the highest priority of transmission data to an ENB in a conventional mobile communication system.

In describing the procedure illustrated in FIG. 1, it will be assumed that capacities of transmission data with priorities 1~4 are 200 bytes, 200 bytes, 300 bytes and 240 bytes, respectively. Although the capacities of transmission data are limited to particular figures in the description of FIG. 1, this is not intended to limit the scope of the present invention. In addition, the Node B referred to herein has a substantially similar meaning as the ENB.

Referring to FIG. 1, if the transmission of data occurs in step 101, a UE 10 sends a request for an allocation of transmission resources to an ENB 20 in step 151. Upon receipt of the transmission resource allocation request, the ENB 20 allocates, in step 153, transmission resources with which it can transmit 300-byte data to the UE 10. Upon receiving the allocated transmission resources over which the 300-byte data can be transmitted, the UE 10 includes, in a Medium Access Control Protocol Data Unit (MAC PDU), 200-byte data with priority 1 corresponding to the highest priority among the priorities of transmission data, in step 103. In this case, the UE 10 allocates the remaining 100-byte transmission capacity in the 300-byte transmission capacity to data with priority 2, or the next priority, and includes 100 bytes in the priority-2 data in a MAC PDU. After allocating all the 300-byte transmission capacity allocated from the ENB 20 according to priorities of the transmission data. In this manner, the UE 10 transmits to the ENB 20 a MAC PDU composed of the priority-1 data and the priority-2 data in step 155.

Upon receipt of the MAC PDU, the ENB 20 considers, in step 131, the lowest priority among the priorities of data contained in the MAC PDU as the highest priority of data that the UE 10 currently stores. That is, the ENB 20 determines priority 2, or the lowest priority among the priorities of data contained in the MAC PDU, as the highest priority among the priorities of data that the UE 10 currently stores. In step 133, the ENB 20 generates scheduling information considering the determined highest priority and transmits the scheduling information to the UE 10.

The transmission resources that the ENB allocated to the UE are preferentially distributed to the highest-priority data. Thus, if the highest-priority data that the UE should transmit is continuously generated before sufficient transmission resources are allocated to the UE, no lower-priority data may be transmitted to the ENB. In this case, for guaranteeing minimum transmission of lower-priority data, i.e., for starvation avoidance, it is possible to guarantee the minimum data rate for the lower-priority data. A description will now be made of a procedure for guaranteeing the minimum data rate of the lower-priority data.

If the ENB 20 allocates 50-byte transmission resources in step 157, the UE 10, which is allocated the transmission resources, determines in step 105 whether there is a need to guarantee the minimum data rate for priority-4 data. If so, the UE 10 preferentially allocates, in step 107, transmission capacity to the priority-4 data that needs the guarantee of the minimum data rate, regardless of a priority of other data. That is, the UE 10 includes 50 bytes in the 240-byte transmission capacity having priority 4 in a MAC PDU and transmits the MAC PDU. Upon receiving the MAC PDU containing the priority-4 data in step 159, the ENB 20 determines the priority 4 among the priorities of the data contained in the received MAC PDU as the highest priority of transmission data of the UE 10 in step 135. In step 137, the ENB 20 generates scheduling information considering the determined highest priority, or priority 4, and transmits the scheduling information to the UE 10 in step 161.

However, although the actual highest priority of data that the UE should transmit at the time the MAC PDU is transmitted to the ENB is priority 2, the lowest priority among the priorities of the data contained in the MAC PDU is priority 4. In other words, if the ENB determines the highest priority based on the lowest priority of the received MAC PDU, it may misjudge the highest priority of data that the UE should transmit. Therefore, the ENB cannot correctly determine the actual highest priority of the UE's transmission data, thereby causing an inefficient allocation of transmission resources.

SUMMARY OF THE INVENTION

An aspect of the present invention is to address at least the above-mentioned problems and/or disadvantages and to provide at least the advantages described below. Accordingly, an aspect of the present invention is to provide a control information transmission/reception apparatus and method capable of providing correct information on priority of uplink transmission data in a mobile communication system, and a system thereof.

Another aspect of the present invention is to provide a control information transmission/reception apparatus and method capable of preventing inefficient allocation of transmission resources while guaranteeing minimum transmission of lower-priority data in a mobile communication system, and a system thereof.

Still another aspect of present invention is to provide a control information transmission/reception apparatus and method in which a UE includes priority indicator information of transmission data in a MAC PDU and transmits it to an ENB, so the ENB can correctly determine a highest priority of the transmission data in a mobile communication system, and a system thereof.

In accordance with an aspect of the present invention, a method for transmitting control information for uplink data in a mobile communication system is provided. The method includes defining a plurality of transmission data having different priorities, and determining whether there is a need for transmission of particular transmission data, for which a minimum data rate should be guaranteed, among the plurality of transmission data, and when there is a need for transmission of the particular transmission data, transmitting control information indicating a highest priority among priorities of the plurality of transmission data, along with the particular transmission data.

In accordance with another aspect of the present invention, an apparatus for transmitting control information for uplink data in a mobile communication system is provided. The apparatus includes a memory for storing a plurality of transmission data having different priorities, a transmitter for uplink-transmitting at least one transmission data selected according to its priority, among the plurality of transmission data, and a controller for controlling the transmitter so that when there is a need for transmission of particular transmission data, for which a minimum data rate should be guaranteed, among the plurality of transmission data, control information indicating a highest priority among priorities of the plurality of transmission data is transmitted along with the particular transmission data.

In accordance with yet another aspect of the present invention, a method for receiving control information for uplink data in a mobile communication system is provided. The method includes receiving through an uplink a packet in which at least one transmission data to which a priority is assigned is included, determining whether control information indicating a highest priority among priorities of remaining transmission data to be transmitted at a transmitter for transmitting the transmission data, exists in the received packet, and when the control information exists, allocating resources through which the transmitter will transmit the remaining transmission data, based on the highest priority.

In accordance with still another aspect of the present invention, an apparatus for receiving control information for uplink data in a mobile communication system is provided. The apparatus includes a receiver for receiving through an uplink a packet in which at least one transmission data to which a priority is assigned is included, and a controller for determining whether control information indicating a highest priority among priorities of remaining transmission data to be transmitted at a transmitter for transmitting the transmission data, exists in the received packet, and when the control information exists, for allocating resources through which the transmitter will transmit the remaining transmission data, based on the highest priority.

In accordance with still another aspect of the present invention, a mobile communication system for transmitting and receiving control information for uplink data is provided. The system includes a User Equipment (UE) for, when there is a need for transmission of particular transmission data, for which a minimum data rate should be guaranteed, among a plurality of transmission data, transmitting through an uplink a packet in which control information indicating a highest priority among priorities of the plurality of transmission data and the particular transmission data are included, and an Enhanced Node B (ENB) for determining whether the control information indicating the highest priority exists in a received packet, and when the control information exists, allocating resources through which the UE will transmit remaining transmission data, based on the highest priority.

In accordance with still another aspect of the present invention, a mobile communication system for transmitting and receiving control information for uplink data is provided. The system includes a User Equipment (UE) for storing a plurality of transmission data having different priorities in a buffer, for recording a lowest priority among priorities of at least one transmission data every time the UE transmits a packet including the at least one transmission data among the plurality of transmission data, for generating the packet, and for transmitting control information when a highest priority among priorities of transmission data left in the buffer is higher than the recorded lowest priority, and an Enhanced Node B (ENB) for, when the control information is received from the UE, allocating resources through which the UE will transmit remaining transmission data, based on the control information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description when taken in conjunction with the accompanying drawings in which:

FIG. 7A is a diagram illustrating a structure of control information according to the first exemplary embodiment of the present invention;

FIG. 7B is a diagram illustrating another structure of control information according to the first exemplary embodiment of the present invention;

Throughout the drawings, it should be noted that like reference numbers are used to depict the same or similar elements, features and structures.

DETAILED DESCRIPTION OF EXEMPLARY EMBODIMENTS

Figure 1:
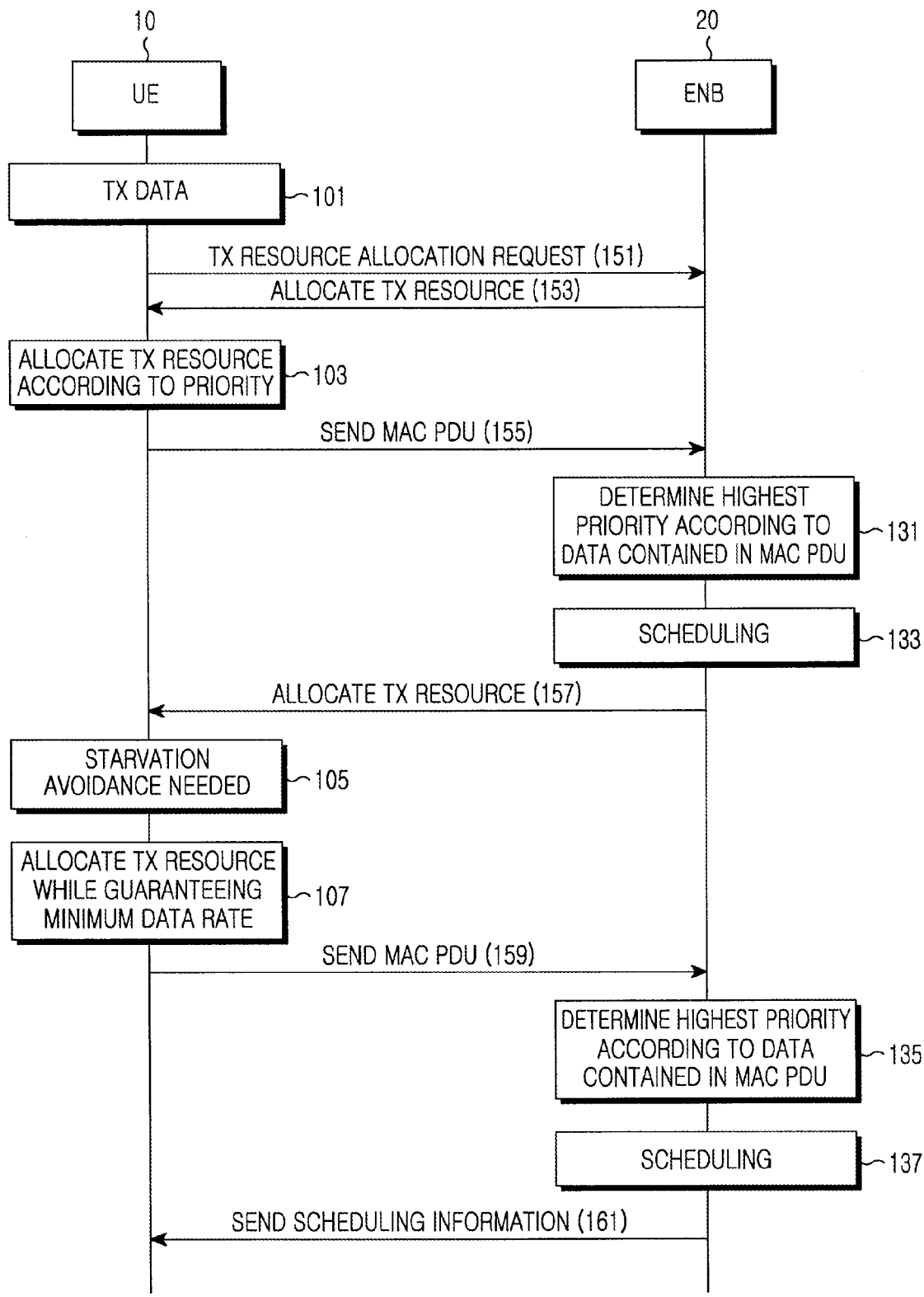
FIG. 1 is a diagram illustrating a procedure for reporting by a User Equipment (UE) the highest priority of transmission data to an ENB in a conventional mobile communication system.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions well-known functions and constructions are omitted for clarity and conciseness. Further, the same or similar elements are denoted by the same reference numerals even though they are depicted in different drawings.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 2:
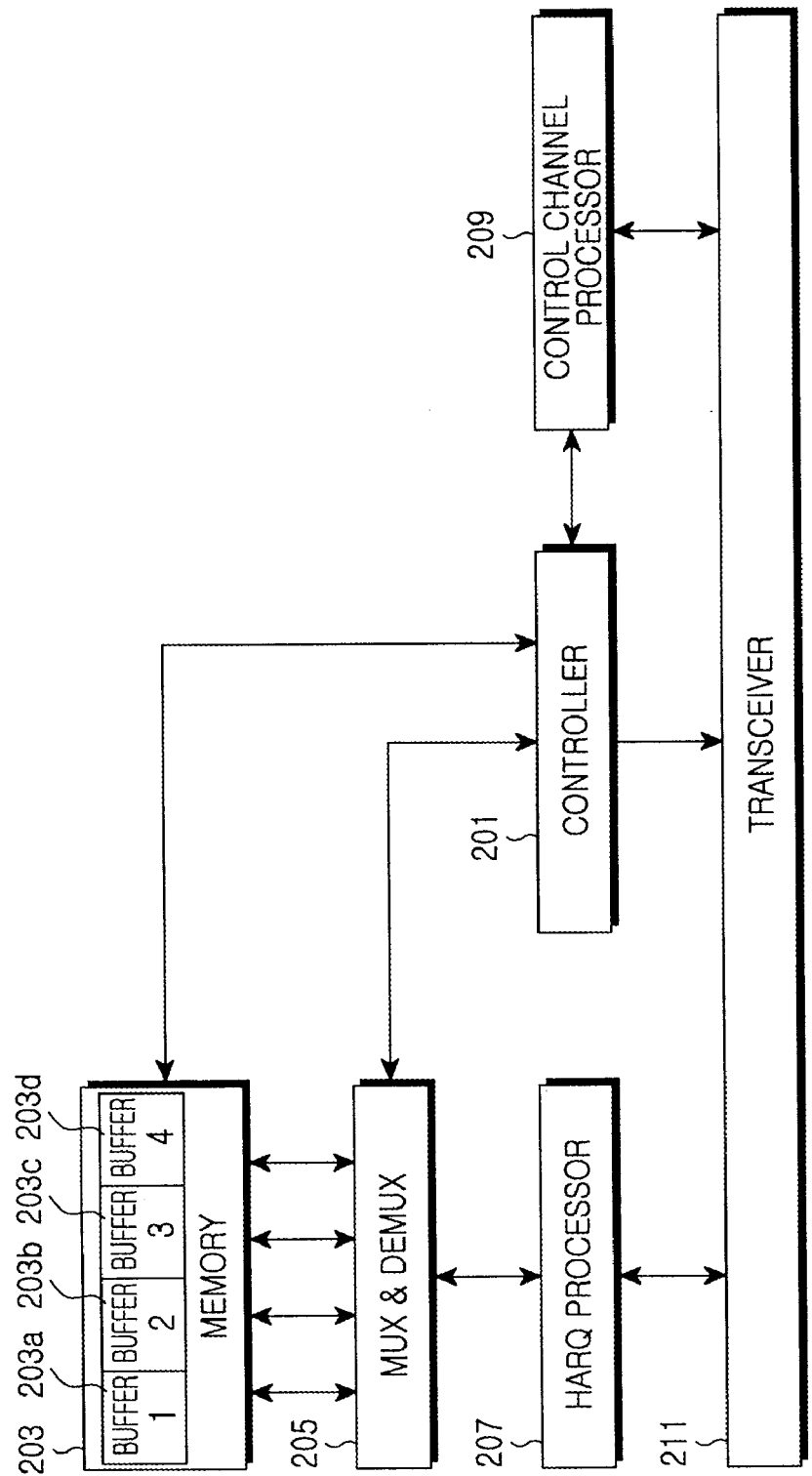
FIG. 2 is a block diagram illustrating an internal structure of a UE according to an exemplary embodiment of the present invention.

FIG. 2 is a block diagram illustrating an internal structure of a UE according to an exemplary embodiment of the present invention.

Referring to FIG. 2, according to an exemplary embodiment of the present invention, the UE includes a transceiver 211, a multiplexer and demultiplexer 205, a control channel processor 209, a Hybrid Automatic Repeat reQuest (HARQ) processor 207, a memory 203, and a controller 201.

The transceiver 211 frequency-up-converts transmission packet data into a frequency used in the wireless communication system, and transmits it to an ENB over a wireless channel. In addition, the transceiver 211 frequency-down-converts packet data received from the ENB over a channel allocated by the controller 201, into a baseband signal, and converts the baseband signal into a digital signal.

During packet data reception, the HARQ processor 207 requests HARQ retransmission of the packet data according to a scheme used in the wireless communication system. During packet data transmission, upon receipt of an HARQ retransmission request according to the scheme that is used in the wireless communication system, the HARQ processor 207 controls retransmission of the packet data according to a corresponding scheme.

During data transmission, the multiplexer and demultiplexer 205 performs multiplexing under the control of the controller 201, and outputs transmission data in one data stream. During data reception, the multiplexer and demultiplexer 205, under the control of the controller 201, classifies service data included in one data stream according to services. That is, the multiplexer and demultiplexer 205 demultiplexes a data stream received during data reception according to services. Further, in performing multiplexing, the multiplexer and demultiplexer 205 can include Highest Priority Indicator (HPI) information of a MAC PDU within the MAC PDU. A detailed description thereof will be given with reference to the accompanying drawing, with respect to each exemplary embodiment.

Referring to FIG. 2, the control channel processor 209 receives control channel information from the transceiver 211, demodulates and decodes the control channel, and provides control information to the controller 201. The control information includes various signaling information and priority indicator information of transmission data according to each exemplary embodiment of the present invention. Control information according to an exemplary embodiment of the present invention will be described in more detail with respect to each of the exemplary embodiments.

The memory 203 includes at least one buffer capable of storing service data for each service. It is assumed in FIG. 2 that 4 buffers for individual services are provided. Therefore, different service data is stored in each of buffers 203a, 203b, 203c and 203d.

The controller 201 controls the overall operations of the UE. That is, the controller 201 controls the multiplexer and demultiplexer 205, the transceiver 211, the control channel processor 209 and the memory 203. In addition, the controller 201 performs a control operation according to an exemplary embodiment of the present invention so that the ENB provides priority information of transmission data. Such a control operation differs according to exemplary embodiments. A brief description will now be made of an operation of the controller 201 according to each exemplary embodiment of the present invention.

If the actual highest priority among the priorities of transmission data that a UE should transmit to an ENB is higher than the lowest priority among the priorities contained in the current MAC PDU, the controller 201 according to a first exemplary embodiment generates indicator information indicating the highest priority of the transmission data, and delivers the indicator information to a multiplexing device. The controller 201 according to the second exemplary embodiment updates a variable V (Expected Highest Priority (EHP)) indicating the highest priority of an UE's transmission data that the ENB estimates, after transmission of a MAC PDU. Herein, the variable V (EHP) is updated in the same manner as the conventional ENB determines the highest priority in the example discussed above with reference to FIG. 1. If the actual highest priority of transmission data is lower than or equal to the priority indicated by the variable V (EHP), the controller 201 controls the UE to transmit 0 over a Scheduling Request Channel (SRCH), and if the actual highest priority of the transmission data is higher than the priority indicated by the variable V (EHP), the controller 201 controls the UE to transmit 1 over an SRCH. The controller 201 according to the third exemplary embodiment manages variable V (EHP), and if the actual highest priority of transmission data is higher than the priority indicated by the variable V (EHP), the controller 201 controls the control channel processor 209 to transmit 1 over an SRCH a predefined number of times corresponding to a difference between the two priorities.

Figure 3:
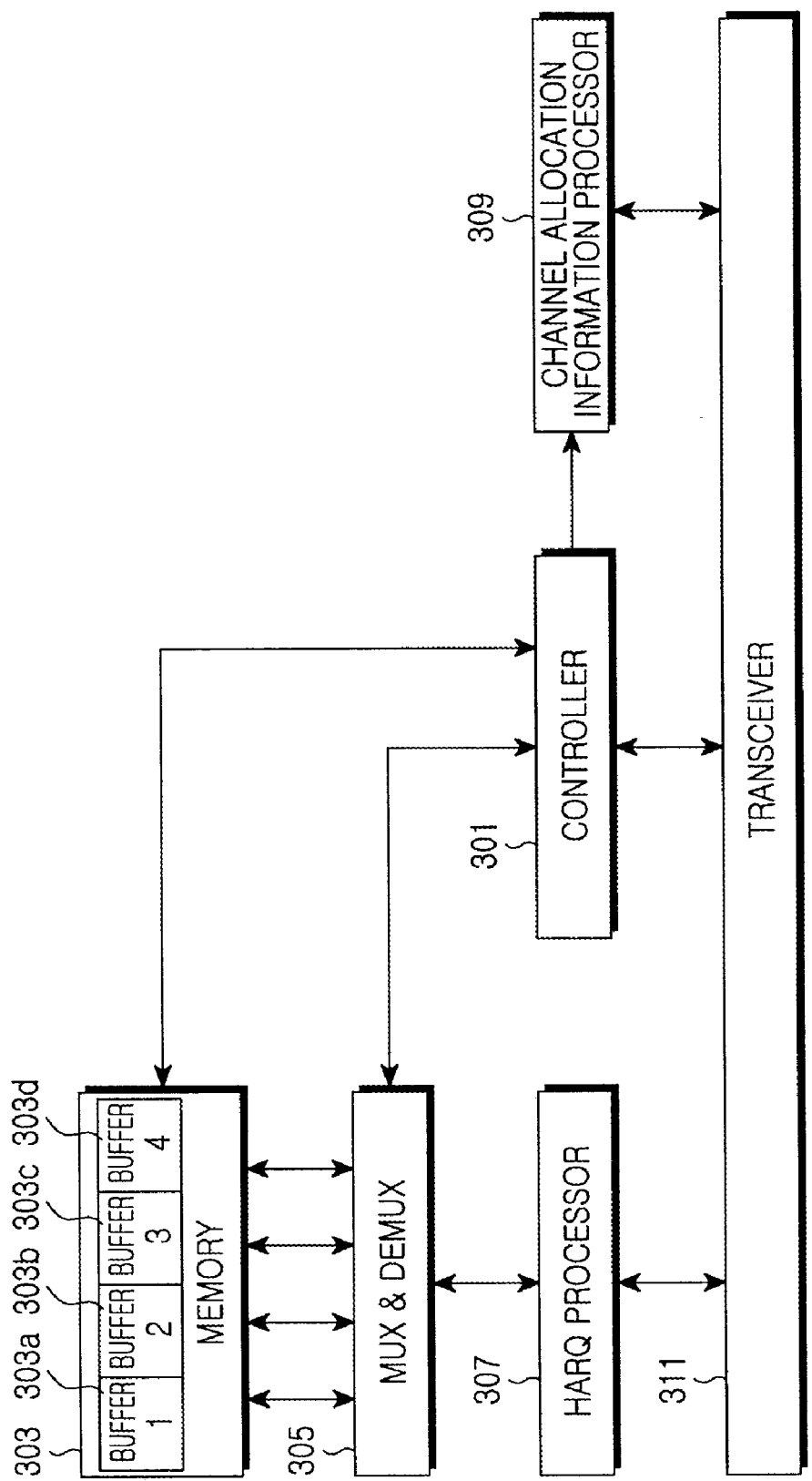
FIG. 3 is a block diagram illustrating an internal structure of an Enhanced Node B (ENB) according to an exemplary embodiment of the present invention.

FIG. 3 is a block diagram illustrating an internal structure of an ENB according to an exemplary embodiment of the present invention.

Referring to FIG. 3, according to an exemplary embodiment of the present invention, the ENB includes a transceiver 311, a multiplexer and demultiplexer 305, a channel allocation information processor 309, an HARQ processor 307, a memory 303, and a controller 301.

The transceiver 311, under the control of the controller 301, frequency-up-converts desired transmission packet data into a frequency agreed used in the wireless communication system, and delivers it to a UE over a wireless channel. Further, the transceiver 311 frequency-down-converts packet data received from the UE over a channel allocated under the control of the controller 301, into a baseband signal, and converts the baseband signal into a digital signal.

During packet data reception, the HARQ processor 307 requests HARQ retransmission of the packet data according to a scheme used in the wireless communication system. During packet data transmission, upon receipt of an HARQ retransmission request according to the scheme that is used, the HARQ processor 307 controls retransmission of the packet data according to the corresponding scheme.

During data transmission, the multiplexer and demultiplexer 305 performs multiplexing under the control of the controller 301, and outputs transmission data in one data stream. During data reception, the multiplexer and demultiplexer 305, under the control of the controller 301, classifies service data included in one data stream according to services. That is, the multiplexer and demultiplexer 305 demultiplexes a data stream received during data reception according to services. It should be noted herein that one data stream being processed in the multiplexer and demultiplexer 305 is a data stream for one user.

The channel allocation information processor 309 receives channel allocation information from the controller 301, changes the received channel allocation information into a control message to be transmitted to the UE, and then outputs the control message to the transceiver 311. The memory 303 includes one or more buffers capable of storing service data for individual services. It is assumed in FIG. 3 that 4 buffers for individual services are provided, namely buffers 303a, 303b, 303c and 303d. Therefore, different service data is stored in each of buffers 303a, 303b, 303c and 303d. It should be noted that the data stored in each of the buffers 303a, 303b, 303c and 303d is data for one corresponding user.

Upon receipt of a scheduling request from a particular UE, the controller 301 performs scheduling, and in particular, controls rescheduling according to exemplary embodiments of the present invention. Further, the controller 301 determines a priority of transmission data received from the UE according to the first exemplary embodiment, second exemplary embodiment, or third exemplary embodiment, and performs the overall control of the ENB to perform scheduling according to the determined priority, and a detailed description of control operations of the controller 301 will be given with respect to each exemplary embodiment.

A description will now be made of a procedure in which a UE reports its actual highest priority to an ENB, according to three exemplary embodiments of the present invention.

First Exemplary Embodiment

Figure 4:
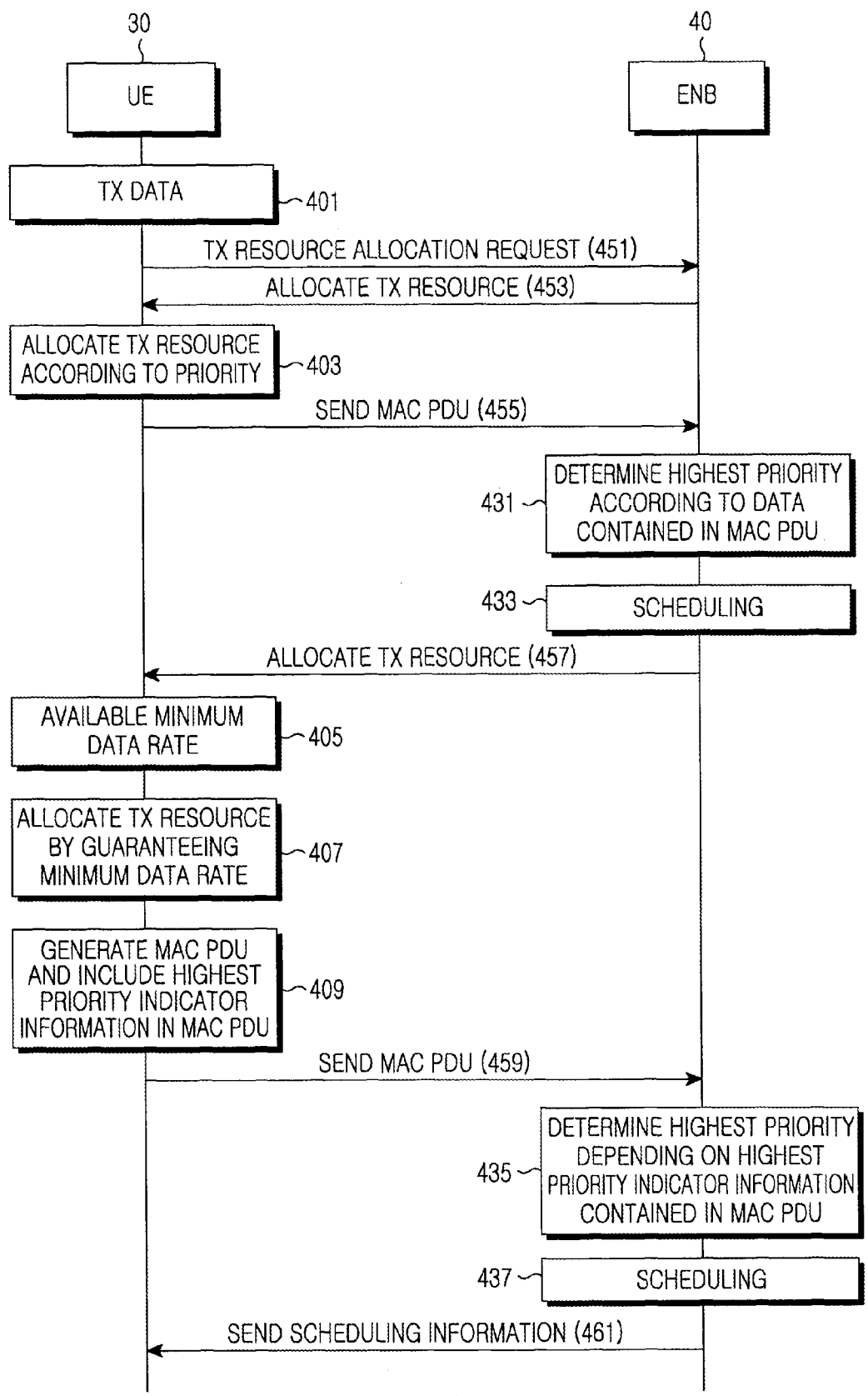
FIG. 4 is a diagram illustrating a procedure for reporting by a UE a highest priority to an ENB according to a first exemplary embodiment of the present invention.

FIG. 4 is a diagram illustrating a procedure for reporting by a UE a highest priority to an ENB according to a first exemplary embodiment of the present invention.

Referring to FIG. 4, in the first exemplary embodiment, the minimum data rate is realized with a token bucket. If the minimum data rate of (x*1000)/y bps is assigned to an arbitrary buffer that needs a guarantee of a minimum data rate, a right to transmit a y-byte token, i.e., y bits, is accumulated in the buffer every x msec, and the token or transmission right is subtracted by an amount corresponding to an amount used. In other words, the token is not always available, and there is no token until x msec lapses.

If a transmission of data occurs in step 401, a UE 30 sends a request for allocation of transmission resources to an ENB 40 in step 451. Upon receipt of the transmission resource allocation request from the UE 30, the ENB 40 allocates transmission resources to the UE 30 and transmits resource allocation information in step 453. Upon receiving the allocated transmission resources, the UE 30 preferentially allocates, in step 403, the transmission capacity to the data with the highest priority among the priorities of transmission data stored in buffers of a memory.

Thereafter, in step 455, the UE 30 includes the highest-priority data in a MAC PDU and transmits the MAC PDU to the ENB 40. Upon receiving the MAC PDU containing transmission data from the UE 30, the ENB 40 determines in step 431 the lowest priority among the priorities of transmission data contained in the MAC PDU as the actual highest priority of the transmission data of the UE 30. The ENB 40 performs scheduling considering the determined highest priority in step 433, and transmits scheduling information including transmission resource allocation information to the UE 30 in step 457.

This procedure is performed when there is not a minimum data rate available in the UE 30 for the data in buffers needing starvation avoidance. The procedure is substantially similar to steps 101~133 of FIG. 1, which represents the procedure for determining by the ENB the highest priority among the priorities of transmission data in a conventional mobile communication system.

On the other hand, if there is a minimum data rate available for data in buffers needing starvation avoidance in step 405, the UE 30 preferentially allocates the transmission capacity to data with the priority needing starvation avoidance in order to guarantee the minimum data rate for the data with the priority needing starvation avoidance in step 407. Thereafter, in step 409, the UE 30 includes the data with the priority needing starvation avoidance in a MAC PDU. Since the lowest priority of a MAC PDU through which the UE 30 preferentially transmits the data needing starvation avoidance may not be coincident with the actual priority of transmission data of the UE 30, the UE 30 generates a MAC PDU by including indicator information indicating the actual highest priority of transmission data in the MAC PDU. In step 459, the UE 30 transmits the MAC PDU containing the HPI information to the ENB 40. Upon receiving the MAC PDU containing HPI information from the UE 30, the ENB 40 determines the highest priority for transmission data of the UE 30 depending on the HPI information contained in the MAC PDU in step 435. Thereafter, the ENB 40 schedules resource allocation considering the determined highest priority in step 437, and transmits the scheduling information to the UE 30 in step 461.

Figure 5:
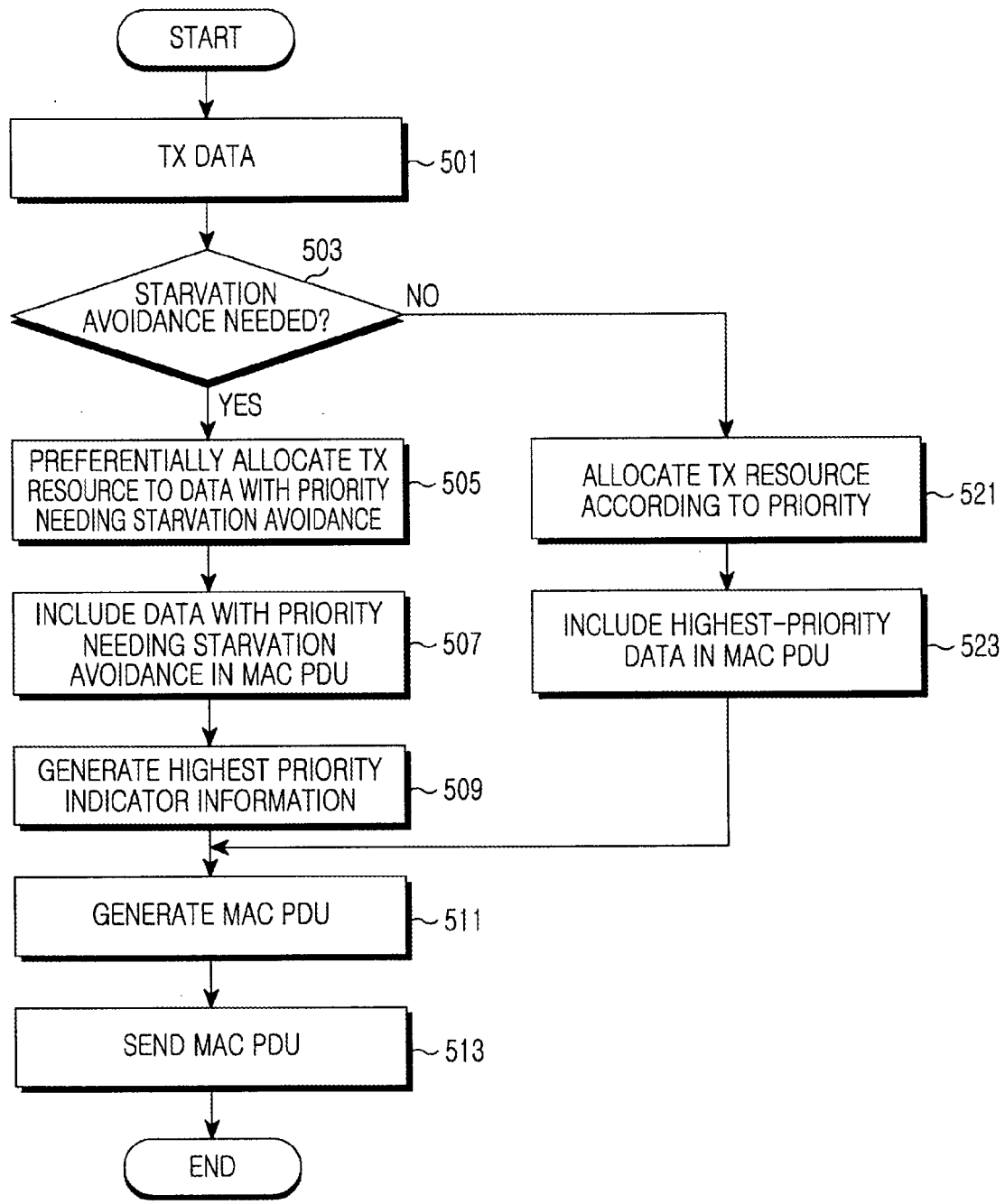
FIG. 5 is a flowchart illustrating a procedure for reporting by a UE a highest priority to an ENB according to the first exemplary embodiment of the present invention.

FIG. 5 is a flowchart illustrating a procedure for reporting by a UE a highest priority to an ENB according to the first exemplary embodiment of the present invention.

Referring to FIG. 5, if transmission resources are allocated in step 501, the UE determines in step 503 whether there is a minimum data rate available for the data needing starvation avoidance. If there is an available minimum data rate, the UE preferentially allocates the transmission capacity to data with the priority needing starvation avoidance in step 505. In step 507, the UE includes the data with the priority needing starvation avoidance in a MAC PDU. As a result, the highest priority among the priorities of the data stored in the UE may not be coincident with the lowest priority among the priorities of data contained in the MAC PDU. Therefore, if the actual highest priority is not coincident with the lowest priority among the priorities of data contained in the MAC PDU, the UE includes HPI information indicating the actual highest priority in the MAC PDU in step 509. In step 511, the UE generates a MAC PDU by adding a MAC header to the MAC PDU containing the HPI information. In step 513, the UE transmits the generated MAC PDU to an ENB.

However, if there is no available minimum data rate in step 503, i.e., if there is no data that needs starvation avoidance, the UE preferentially allocates transmission resources to data with the highest priority among the priorities of the transmission data according to the existing scheme in step 521. The UE includes the data with the highest priority among the priorities of the transmission data in a MAC PDU in step 523, and then performs steps 511 and 513.

Figure 6:
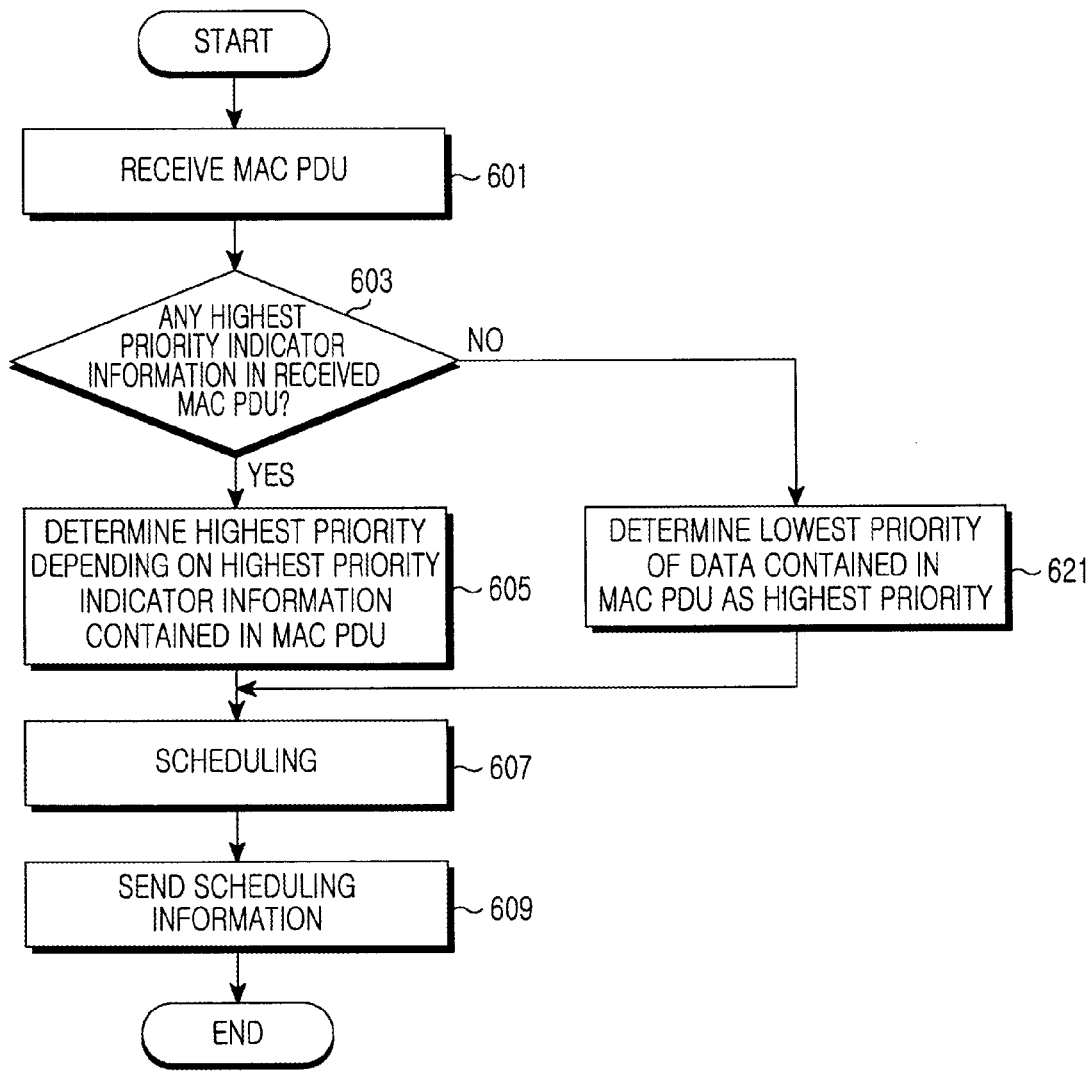
FIG. 6 is a flowchart illustrating a procedure for estimating by an ENB a highest priority using control information transmitted from a UE according to the first exemplary embodiment of the present invention.

FIG. 6 is a flowchart illustrating a procedure for estimating by an ENB a highest priority using control information transmitted from a UE according to the first exemplary embodiment of the present invention.

Upon receiving a MAC PDU from a UE 30 in step 601, an ENB 40 determines in step 603 whether HPI information is contained in the received MAC PDU. If HPI information is contained in the MAC PDU, the ENB 40 determines the highest priority of transmission data of the UE 30 depending on the HPI information in step 605.

However, if the HPI information is not contained in the MAC PDU, the ENB 40 determines the lowest priority among the priorities of data contained in the MAC PDU as the highest priority of transmission data of the UE 30 according to an existing scheme in step 621.

The ENB 40 performs scheduling considering the determined highest priority in step 607, and transmits the scheduling information to the UE 30 in step 609.

The HPI information, one of MAC control information, is control information indicating the highest priority among the priorities of the data left after including data in a MAC PDU. A detailed description of the HPI information will be made with reference to FIGS. 7A to 8C.

FIG. 7A is a diagram illustrating a structure of control information according to the first exemplary embodiment of the present invention.

Referring to FIG. 7A, the HPI information, a type of MAC control information, can be, for example, control information including type information 701 indicating a type of the control information and information 703 indicating the highest priority among the priorities of data left after including data in a MAC PDU.

FIG. 7B is a diagram illustrating another structure of control information according to the first exemplary embodiment of the present invention.

Referring to FIG. 7B, the HPI information can be composed of type information 751 indicating a type of the control information, information 753 indicating the highest priority among the priorities of data left after including data in a MAC PDU, and buffer size information 755 indicating the amount of data with the highest priority.

Figure 8A:
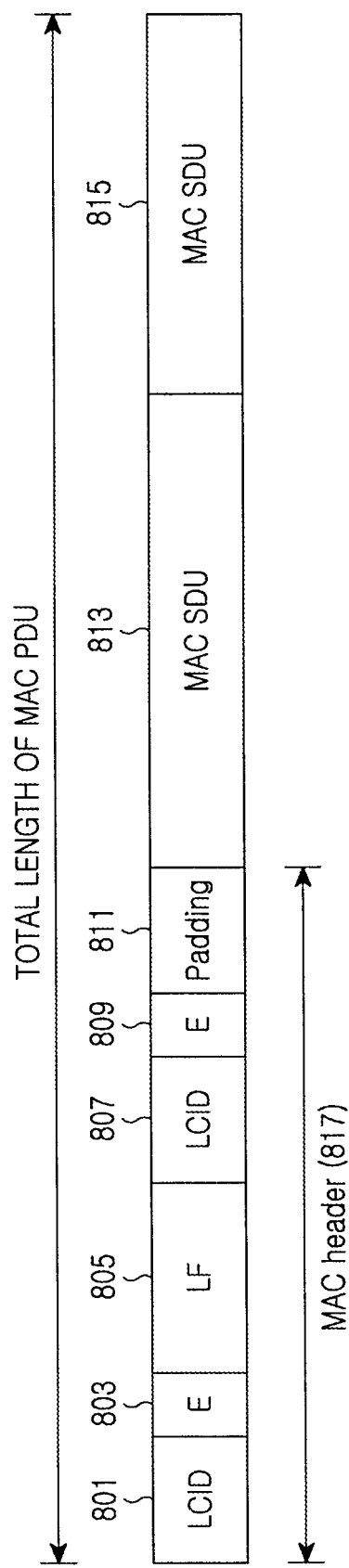
FIG. 8A is a diagram illustrating a structure of a conventional Medium Access Control Protocol Data Unit (MAC PDU)

FIG. 8A is a diagram illustrating a structure of a conventional MAC PDU.

Referring to FIG. 8A, a packet transmitted/received over a wireless channel is called a MAC PDU, and into the MAC PDU are multiplexed upper layer packets called Medium Access Control Service Data Units (MAC SDUs) 813 and 815. A MAC header 817 is composed of Logical Channel IDs (LCIDs) 801 and 807, Es 803 and 809, a Length Field (LF) 805 and padding 811. LCIDs 801 and 807 are information on an upper layer of MAC SDUs. Es 803 and 809 are information indicating the boundary between the MAC header and the MAC SDUs. LF 805 is information on a size of the MAC SDUs. In the MAC header 817, there is an LCID and an E corresponding to each MAC SDU. In the MAC header 817, there is an LF exits corresponding to each MAC SDU except for the last MAC SDU. The MAC header 817 does not include an LF corresponding to the last MAC SDU because it is possible to calculate a size of the last MAC SDU from the total length of the MAC PDU that is indicated by a scheduler. For the following description it is assumed that the sizes of the MAC header fields are LCID=5 bits, E=1 bit, and LF=10 bits or 18 bits.

In order to reduce a processing load of the MAC header, the MAC header is byte-aligned. As shown above, LCID, E and LF individually exist for each corresponding MAC SDU, and a combination of LCID, E and LF is referred to as a MAC header element 817. Since there is no LF in a MAC header element for the last MAC SDU, a padding 811 of a preset number of bits (for example, 2-bit padding for LCID=5 bits) is added to the rear of the E bit. It is possible to include HPI information in a padding part that exists in the rear of an E bit of a MAC header element for the last MAC SDU. One of the two bits is used for another purpose, and only the remaining one bit can be used as the HPI information. Alternatively, the two bits both can be used as the priority indicator information.

Figure 8B:
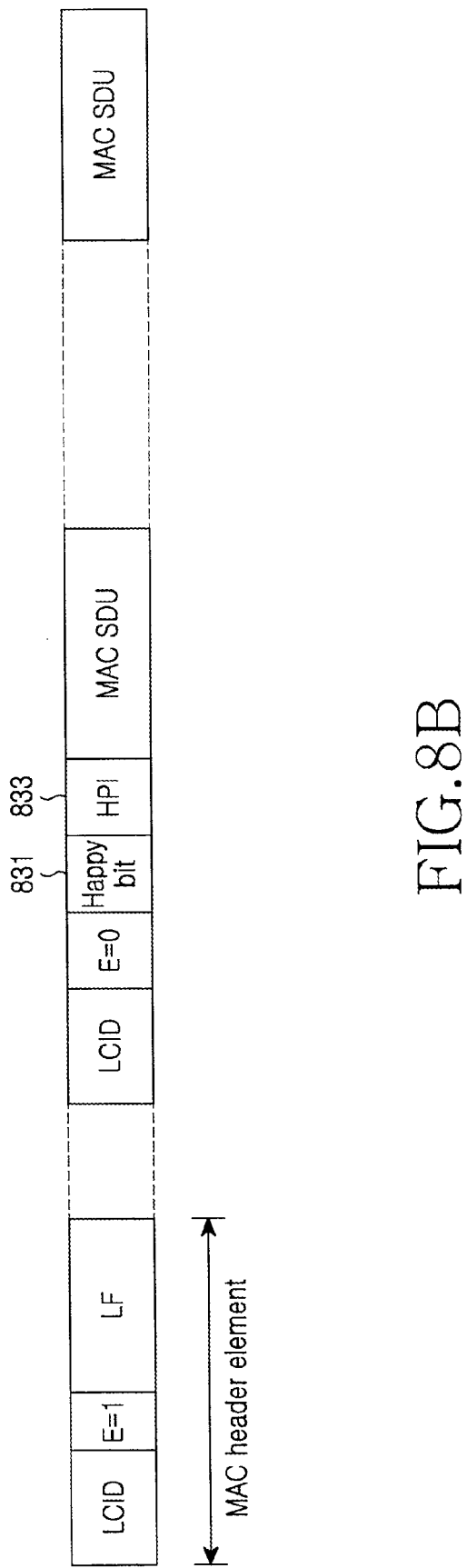
FIG. 8B is a diagram illustrating a structure of a MAC PDU according to the first exemplary embodiment of the present invention.
Figure 8C:
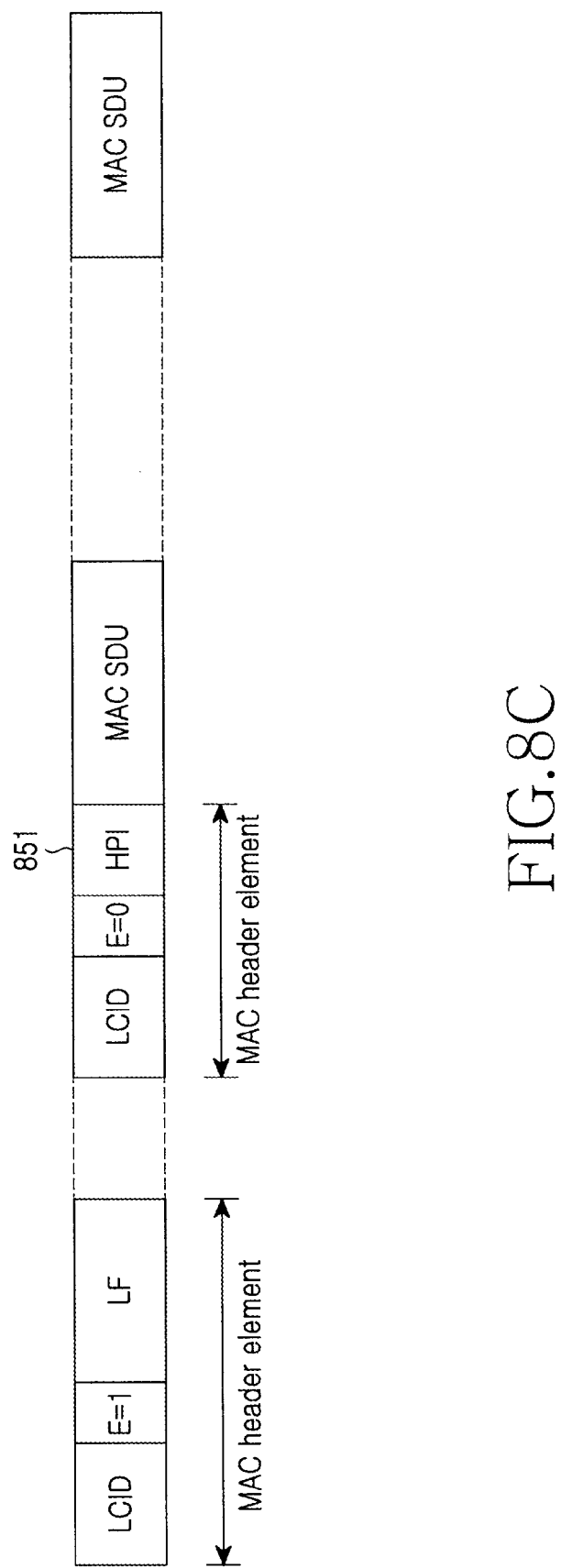
FIG. 8C is a diagram illustrating another structure of a MAC PDU according to the first exemplary embodiment of the present invention.

Referring to FIGS. 8B and 8C, a description will be made of a case where only one bit is used as HPI information, and another case where the two bits are both used as priority indicator information.

FIG. 8B is a diagram illustrating a structure of a MAC PDU according to the first exemplary embodiment of the present invention, in which only one bit is used as HPI information.

Referring to FIG. 8B, the first bit of the last MAC header element is used as a Happy bit 831 by which a UE sends a request for adjustment of a data rate to an ENB, and the second bit is used as HPI information 833. If the HPI information is '0', it denotes that the actual highest priority of UE's transmission data is equal to or lower than the lowest priority among the priorities of data contained in the corresponding MAC PDU. However, if the 1-bit HPI information is '1', it denotes that the actual highest priority of the UE's transmission data is higher than the lowest priority among the priorities of data contained in the corresponding MAC PDU.

FIG. 8C is a diagram illustrating another structure of a MAC PDU according to the first exemplary embodiment of the present invention, in which two bits are both used as HPI information. MAC Header elements allocated for MAC SDUs are illustrated together in FIG. 8C. It is assumed that MAC SDUs illustrated in FIG. 8C are MAC SDUs for 4 different services, and priorities of the transmission data for the 4 services are different from each other. If the number of priorities of transmission data is 4, it is possible to indicate the highest priority using both of the 2 bits that are padded to the end of the MAC Header element. Therefore, it is possible to directly indicate the highest priority with the 2-bit HPI information 851. If the HPI has 2 bits in this way, it is possible to indicate the highest priority among the priorities for the 4 different services using the 2 bits.

Second Exemplary Embodiment

A second exemplary embodiment of the present invention provides a method in which if the highest priority of a UE's transmission data, estimated by an ENB, is different from the actual highest priority of the UE's transmission data, the UE reports it to the ENB by transmitting scheduling request information.

The term 'scheduling request information' refers to 1-bit information which is transmitted over an SRCH which is a periodic transmission resource previously allocated to a UE, and the scheduling request information is transmitted for requesting transmission resource allocation for a buffer status report. If the 1-bit information transmitted as the scheduling request information is '0', it denotes that the highest priority estimated by the ENB is equal to or less than the actual highest priority of the data that the corresponding UE should transmit. On the other hand, if the 1-bit information is '1', it denotes that the highest priority estimated by the ENB is higher than the actual highest priority of the data that the corresponding UE should transmit, or that a significant change has occurred in the actual buffer status as compared with the buffer status estimated by the ENB. In the case where the scheduling request information is transmitted after undergoing on/off keying modulation, if the 1-bit information is '0', it may mean that no signal is actually transmitted.

In the second exemplary embodiment, the UE manages the highest priority of transmission data, estimated by the ENB, using a variable V (EHP). Since the ENB determines the lowest priority among the priorities of data contained in a MAC PDU received from the UE, as the actual highest priority of the corresponding UE, in the variable V (EHP) is recorded as the lowest priority among the priorities of data contained in the MAC PDU last transmitted to the ENB. Therefore, the UE updates the variable V (EHP) whenever it transmits a new MAC PDU, and if the actual highest priority of the UE's transmission data is higher than the priority indicated by the variable V (EHP), the UE transmits '1' over an SRCH.

Figure 9:
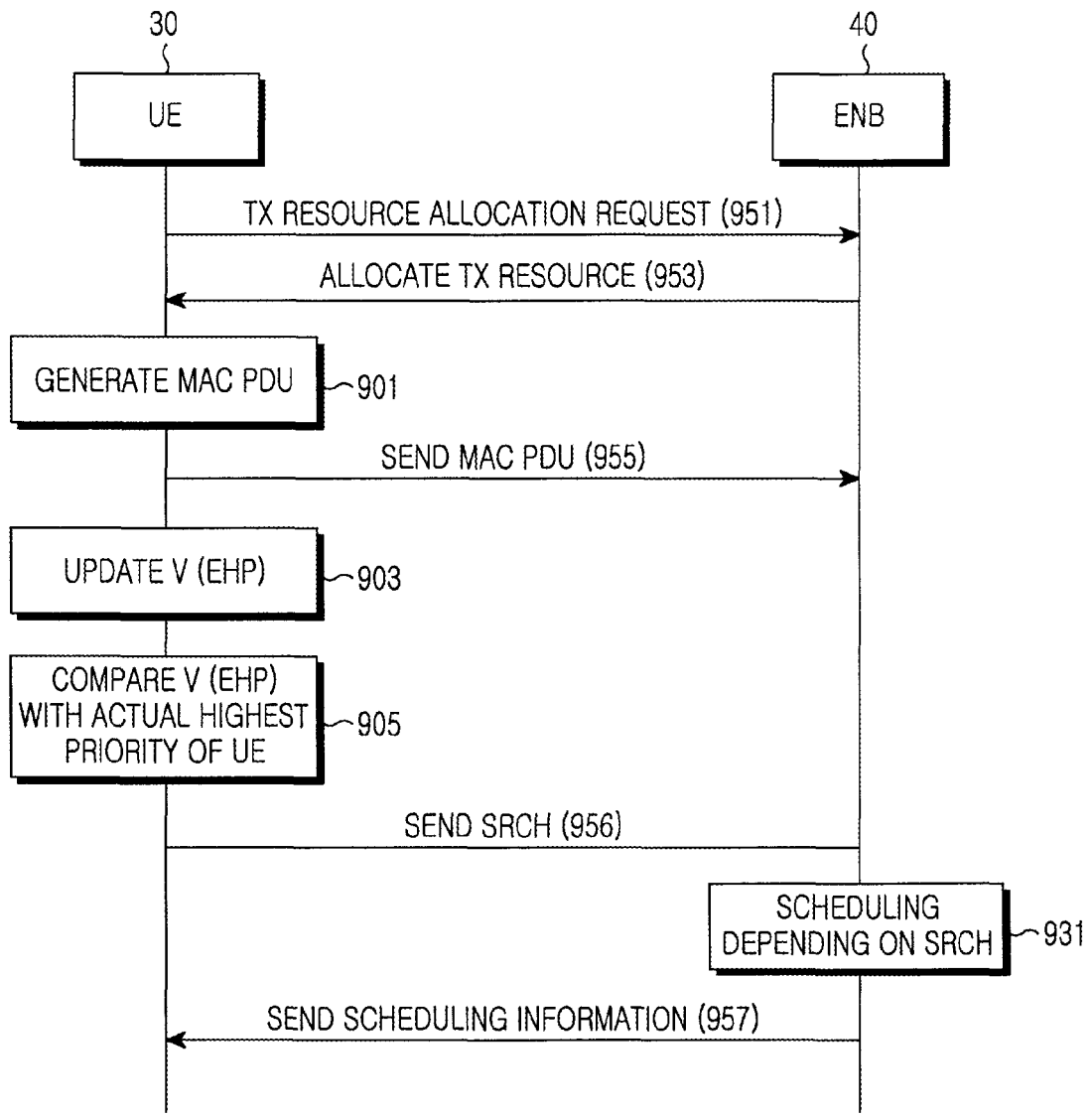
FIG. 9 is a diagram illustrating a procedure for reporting by a UE a change in a highest priority to an ENB according to a second exemplary embodiment of the present invention.

With reference to FIG. 9, a description will now be made of a procedure for reporting by a UE a change in a highest priority to an ENB according to the second exemplary embodiment of the present invention.

FIG. 9 is a diagram illustrating a procedure for reporting by a UE a change in a highest priority to an ENB according to the second exemplary embodiment of the present invention.

In step 951, a UE 30 sends a request for a transmission resource allocation to an ENB 40. Upon receipt of the transmission resource allocation request from the UE 30, the ENB 40 allocates transmission resources and transmits the resource allocation information to the UE 30 in step 953. Upon receiving the allocated transmission resources from the ENB 40, the UE 30 generates a MAC PDU in step 901, and transmits the generated MAC PDU to the ENB 40 in step 955.

After transmitting the MAC PDU to the ENB 40, the UE 30 updates the variable V (EHP) in step 903. In step 905, the UE 30 compares the updated variable V (EHP) with the actual highest priority of transmission data of the UE 30, and reports the comparison result to the ENB 40 over an SRCH in step 956.

If the variable V (EHP) is higher than or equal to the actual highest priority of the UE's transmission data, the UE 30 transmits '0' over an SRCH, and if the variable V (EHP) is lower than the actual highest priority of the UE's transmission data, the UE 30 transmits '1' over an SRCH, reporting that the lowest priority among the priorities of data contained in the MAC PDU is different from the actual highest priority of transmission data of the UE 30.

Upon receipt of the SRCH, the ENB 40 performs scheduling depending on the contents received in the SRCH in step 931, and transmits the scheduling information to the UE 30 in step 957.

Figure 10:
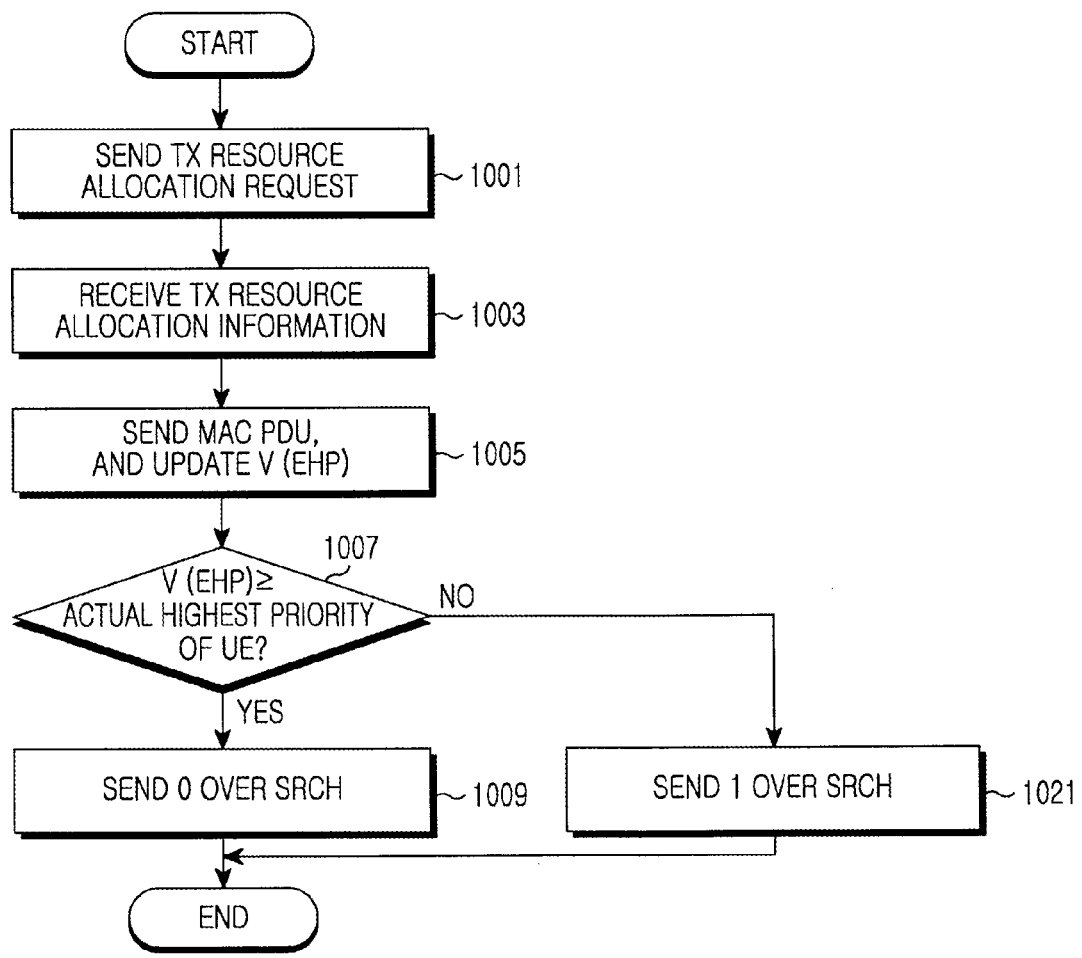
FIG. 10 is a flowchart illustrating a procedure for reporting by a UE a change in a highest priority to an ENB according to the second exemplary embodiment of the present invention.

Referring to FIG. 10, a detailed description will now be made of an operation of a UE that performs the above procedure.

FIG. 10 is a flowchart illustrating a procedure for reporting by a UE a change in a highest priority to an ENB according to the second exemplary embodiment of the present invention.

When transmission data occurs, an UE 30 sends a request for transmission resource allocation to an ENB 40 in step 1001. In step 1003, the UE 30 receives transmission resource allocation information from the ENB 40. In step 1005, the UE 30 generates a MAC PDU using the received transmission resource allocation information, transmits the MAC PDU to the ENB 40, and updates the variable V (EHP).

Thereafter, in step 1007, the UE 30 compares the updated variable V (EHP) with the actual highest priority of transmission data of the UE 30. As a result of the comparison, if the variable V (EHP) is higher than or equal to the actual highest priority of transmission data of the UE 30, the UE 30 transmits '0' to the ENB 40 over an SRCH in step 1009, reporting that the lowest priority among the priorities of data contained in the transmitted MAC PDU is higher than or equal to the actual highest priority of transmission data of the UE 30.

However, as a result of the comparison of step 1007, if the variable V (EHP) is lower than the actual highest priority of transmission data of the UE 30, the UE 30 transmits '1' over an SRCH in step 1021, reporting that the lowest priority among the priorities of data contained in the transmitted MAC PDU is lower than the actual highest priority of transmission data of the UE 30.

Third Exemplary Embodiment

In the second exemplary embodiment, although the ENB recognizes that the actual highest priority of the UE's transmission data is higher than the highest priority estimated by the ENB, it cannot correctly determine what the actual highest priority of the UE's transmission data is. Therefore, in a third exemplary embodiment, the ENB determines the actual highest priority of the UE's transmission data using the number of '1's repeatedly received over an SRCH. The UE determines the number of '1's it will transmit over the SRCH, considering a difference between its actual highest priority and the highest priority of the UE's transmission data, estimated by the ENB.

Figure 11:
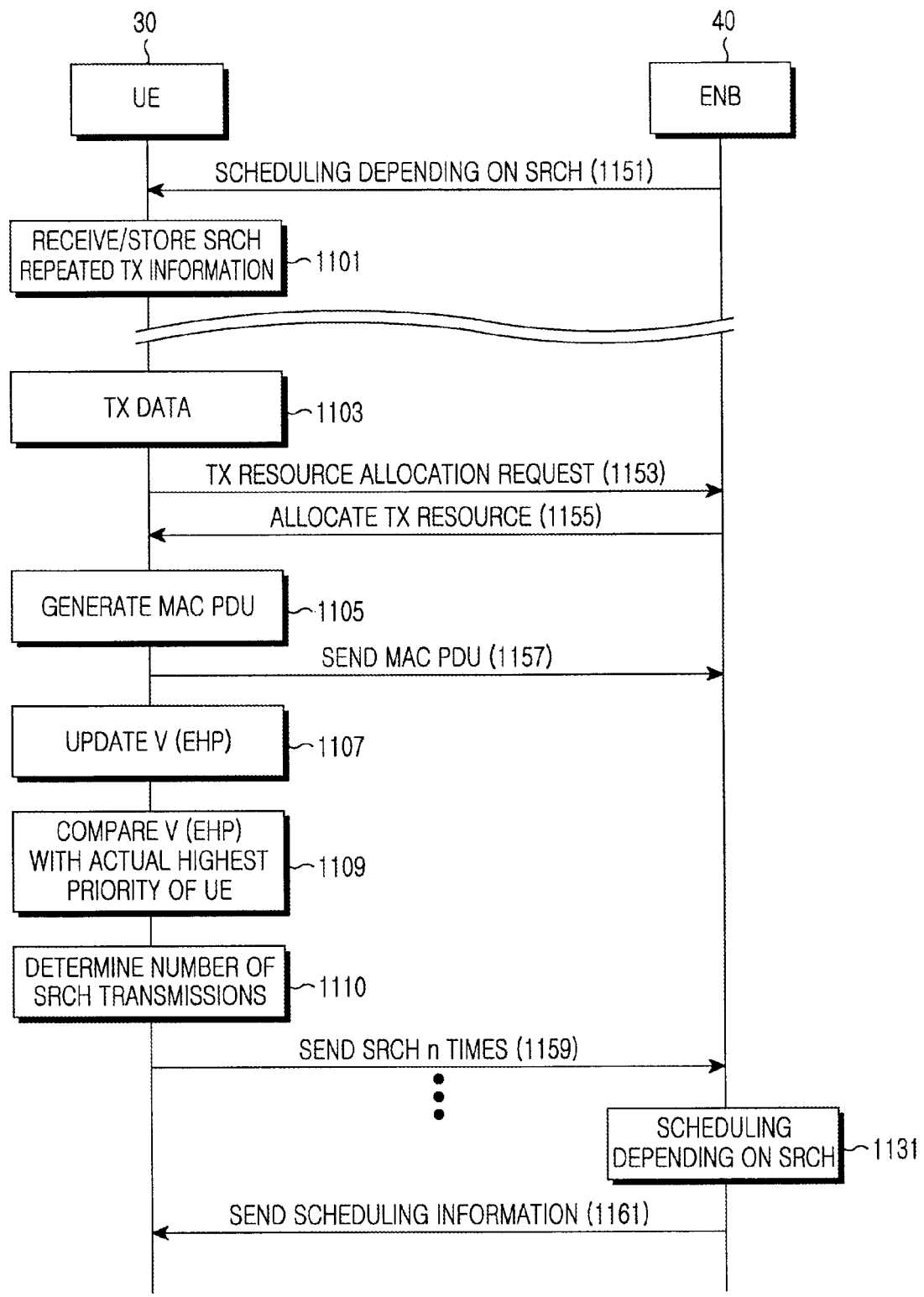
FIG. 11 is a diagram illustrating a procedure for reporting by a UE a change in a highest priority to an ENB according to a third exemplary embodiment of the present invention.

With reference to FIG. 11, the above-stated procedure will be described in detail.

FIG. 11 is a diagram illustrating a procedure for reporting by a UE a change in a highest priority to an ENB according to the third exemplary embodiment of the present invention.

For convenience, a difference between the actual highest priority of UE's transmission data and the variable V (EHP) is denoted as 'x'. The value of x increase as the actual highest priority of the UE's transmission data increases relative to the variable V (EHP). If the priority of the UE's transmission data is indicated as an integer between 1 and n, and a lower value indicates a higher priority, x is an integer determined by subtracting the actual highest priority of the UE's transmission data from the variable V (EHP). For example, in the case where priorities of the transmission data are defined as 1~4 and a lower integer indicates a higher priority, if the variable V (EHP) is 4 and the actual highest priority is 3 at an arbitrary time, then x is 1.

A UE 30 receives SRCH repeated transmission information transmitted by an ENB 40 in step 1151, and stores the received SRCH repeated transmission information in step 1101.

The SRCH repeated transmission information is a value indicating the number of times the UE should repeatedly transmit '1' over an SRCH for every difference between the actual priority of UE's transmission data and the variable V (EHP). For example, SRCH repeated transmission information can be n1 for x=1, n2 for x=2, and n3 for x=3. The SRCH repeated transmission information can be signaled to the UE through a call setup process, and after completing the call setup, the UE performs an uplink data transmission process through a preset procedure.

After a lapse of a preset amount of time, if transmission of data in step 1103, the UE 30 sends a request for transmission resource allocation to the ENB 40 in step 1153. Upon receipt of the transmission resource allocation request from the UE 30, the ENB 40 allocates transmission resources to the UE 30 and transmits the resource allocation information in step 1155. Upon receiving the allocated transmission resources from the ENB 40, the UE 30 generates a MAC PDU in step 1105, and transmits the generated MAC PDU to the ENB 40 in step 1157. Thereafter, the UE 30 updates the variable V (EHP) in step 1107.

In step 1109, the UE 30 compares the updated variable V (EHP) with the actual highest priority of transmission data of the UE 30. In step 1110, the UE 30 calculates a difference between the actual highest priority of transmission data of the UE 30 and the variable V (EHP), and in step 1110 determines the number of times it should repeatedly transmit '1' over an SRCH, i.e., determines the number of SRCH transmissions.

While performing the uplink data transmission process, the UE updates the variable V (EHP) every time it transmits a MAC PDU. The UE compares the variable V (EHP) with the actual highest priority of the UE's transmission information every time transmission data occurs in buffers or every time it transmits a MAC PDU, and if the actual highest priority of the UE's transmission data is higher than the variable V (EHP), the UE calculates a difference therebetween. If it is assumed that a level of a priority of transmission data is higher as it is indicated by a lower integer, a difference between the actual highest priority of the UE's transmission data and the variable V (EHP) is a value determined by subtracting the actual highest priority of the UE's transmission data from the variable V (EHP).

Thereafter, in step 1159, the UE 30 transmits an SRCH to the ENB 40 n times, or as many times as the determined number of SRCH transmissions. Upon receiving the SRCH n times, the ENB 40 performs scheduling depending on the number of SRCH transmissions in step 1131. Thereafter, in step 1161, the ENB 40 transmits scheduling information to the UE 30.

Figure 12:
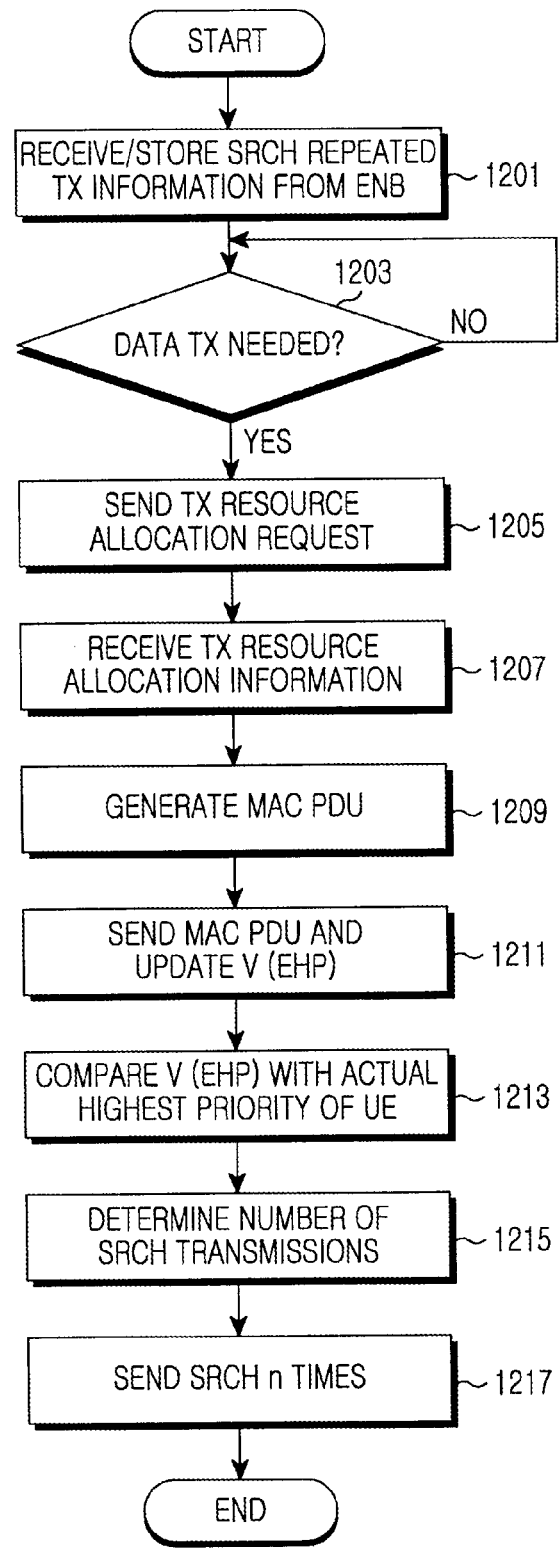
FIG. 12 is a flowchart illustrating a procedure for reporting by a UE a change in a highest priority to an ENB according to the third exemplary embodiment of the present invention.

With reference to FIG. 12, a detailed description will now be made of an operation of a UE that performs the above procedure.

FIG. 12 is a flowchart illustrating a procedure for reporting by a UE a change in a highest priority to an ENB according to the third exemplary embodiment of the present invention.

In step 1201, a UE 30 receives SRCH repeated transmission information from an ENB 40, and stores the received SRCH repeated transmission information. If data transmission is needed as transmission data occurs in step 1203, the UE 30 sends a request for transmission resource allocation to the ENB 40 in step 1205, and receives transmission resource allocation information from the ENB 40 in step 1207. Upon receiving the allocated transmission resources, the UE 30 generates a MAC PDU in step 1209, and then transmits the generated MAC PDU to the ENB 40 and updates the variable V (EHP) in step 1211.

Thereafter, in step 1213, the UE 30 compares the updated variable V (EHP) with the actual highest priority of transmission data of the UE 30. In step 1215, if the actual highest priority of transmission data of the UE 30 is higher than the updated variable V (EHP), the UE 30 calculates a difference therebetween, and determines the number of SRCH transmissions depending thereon. In step 1217, the UE 30 transmits '1' to the ENB 40 over an SRCH n times, or as many times as the determined number of SRCH transmissions.

As is apparent from the foregoing description, according to exemplary embodiments of the present invention, the ENB can determine the highest priority of transmission data received from the UE correctly, thereby making it possible to more efficiently allocate transmission resources to the UE.

While the invention has been shown and described with reference to a certain exemplary embodiments thereof, it will be understood by those skilled in the art that various changes in form and details may be made therein without departing from the spirit and scope of the invention as defined by the appended claims and their equivalents.

What is claimed is:

1. A method for transmitting control information for uplink data in a mobile communication system, the method comprising:
    defining a plurality of transmission data having different priorities;
    determining whether there is a need for transmission of particular transmission data, for which a minimum data rate should be guaranteed, among the plurality of transmission data; and
    when there is a need for transmission of the particular transmission data, transmitting control information indicating a highest priority among priorities of the plurality of transmission data, along with the particular transmission data,
    wherein the control information is information indicating the highest priority among priorities of transmission data left in a buffer after generating a packet, among the plurality of transmission data, and
    wherein the control information is transmitted when an actual highest priority among priorities of transmission data left in the buffer is higher than a lowest priority among priorities of transmission data included in the packet.

2. The method of claim 1, wherein the control information further comprises type information indicating a type of the control information.

3. The method of claim 1, wherein the control information further comprises buffer size information indicating an amount of transmission data having the highest priority.

4. The method of claim 1, wherein the particular transmission data and the control information are transmitted through a Medium Access Control Protocol Data Unit (MAC PDU), and the control information is included in a MAC header element for a last one of at least one Medium Access Control Service Data Unit (MAC SDU) constituting the MAC PDU.

5. The method of claim 4, wherein the control information is included in a padding part in the MAC header element.

6. The method of claim 5, wherein the control information is transmitted using at least one bit of the padding part.

7. An apparatus for transmitting control information for uplink data in a mobile communication system, the apparatus comprising:
    a memory for storing a plurality of transmission data having different priorities;
    a transmitter for uplink-transmitting at least one transmission data selected according to its priority, among the plurality of transmission data; and
    a controller for controlling the transmitter so that when there is a need for transmission of particular transmission data, for which a minimum data rate should be guaranteed, among the plurality of transmission data, control information indicating a highest priority among priorities of the plurality of transmission data is transmitted along with the particular transmission data,
    wherein the control information is information indicating the highest priority among priorities of transmission data left in a buffer after generating a packet, among the plurality of transmission data, and
    wherein the controller transmits the control information when an actual highest priority among priorities of transmission data left in the buffer is higher than a lowest priority among priorities of transmission data included in the packet.

8. The apparatus of claim 7, wherein the control information is transmitted when an actual highest priority among priorities of transmission data left in the buffer is higher than a lowest priority among priorities of transmission data included in the packet.

9. The apparatus of claim 7, wherein the control information further comprises type information indicating a type of the control information.

10. The apparatus of claim 7, wherein the control information further comprises buffer size information indicating an amount of transmission data having the highest priority.

11. The apparatus of claim 7, wherein the transmitter, under control of the controller, generates a Medium Access Control Protocol Data Unit (MAC PDU) using the particular transmission data and the control information and transmits the generated MAC PDU, and the control information is included in a MAC header element for a last one of at least one Medium Access Control Service Data Unit (MAC SDU) constituting the MAC PDU.

12. The apparatus of claim 11, wherein the control information is included in a padding part in the MAC header element.

13. The apparatus of claim 12, wherein the control information is transmitted using at least one bit of the padding part.

14. A method for receiving control information for uplink data in a mobile communication system, the method comprising:
    receiving through an uplink a packet in which at least one transmission data to which a priority is assigned is included;
    determining whether control information indicating a highest priority among priorities of remaining transmission data to be transmitted at a transmitter for transmitting the transmission data, exists in the received packet; and
    when the control information exists, allocating resources through which the transmitter will transmit the remaining transmission data, based on the highest priority,
    wherein the control information is transmitted when particular transmission data, for which a minimum data rate should be guaranteed, is included in the received packet.

15. The method of claim 14, further comprising:
    when the control information does not exist, allocating resources through which the transmitter will transmit the remaining transmission data among the at least one transmission data, based on a lowest priority.

16. An apparatus for receiving control information for uplink data in a mobile communication system, the apparatus comprising:
    a receiver for receiving through an uplink a packet in which at least one transmission data to which a priority is assigned is included; and
    a controller for determining whether control information indicating a highest priority among priorities of remaining transmission data to be transmitted at a transmitter for transmitting the transmission data, exists in the received packet, and when the control information exists, for allocating resources through which the transmitter will transmit the remaining transmission data, based on the highest priority,
    wherein the control information is transmitted when particular transmission data, for which a minimum data rate should be guaranteed, is included in the received packet.

17. The apparatus of claim 16, wherein when the control information does not exist, the controller allocates resources through which the transmitter will transmit the remaining transmission data among the at least one transmission data, based on a lowest priority.

18. A mobile communication system for transmitting and receiving control information for uplink data, the system comprising:
- a User Equipment (UE) for, when there is a need for transmission of particular transmission data, for which a minimum data rate should be guaranteed, among a plurality of transmission data, transmitting through an uplink a packet in which control information indicating a highest priority among priorities of the plurality of transmission data and the particular transmission data are included; and
- an Enhanced Node B (ENB) for determining whether the control information indicating the highest priority exists in a received packet, and when the control information exists, allocating resources through which the UE will transmit remaining transmission data, based on the highest priority,
- wherein the control information is transmitted when the highest priority among priorities of the plurality of transmission data is higher than a lowest priority among priorities of transmission data included in the packet.

19. A mobile communication system for transmitting and receiving control information for uplink data, the system comprising:
- a User Equipment (UE) for storing a plurality of transmission data having different priorities in a buffer, for recording a lowest priority among priorities of at least one transmission data every time the UE transmits a packet including the at least one transmission data among the plurality of transmission data, for generating the packet, and for transmitting control information indicating a highest priority among priorities of the plurality of transmission data when the highest priority among priorities of transmission data left in the buffer is higher than the recorded lowest priority; and
- an Enhanced Node B (ENB) for, when the control information is received from the UE, allocating resources through which the UE will transmit remaining transmission data, based on the control information.

20. The mobile communication system of claim 19, wherein the number of transmissions for the control information is determined according to a difference between the highest priority and the lowest priority.

* * * * *